June 7, 1960 J. C. WISE 2,939,277
ENGINE DIFFUSER SPIKE POSITIONING SYSTEM
Filed Feb. 24, 1954 3 Sheets-Sheet 1

INVENTOR,
JAMES C. WISE
BY K. E. Giauque
ATTORNEY

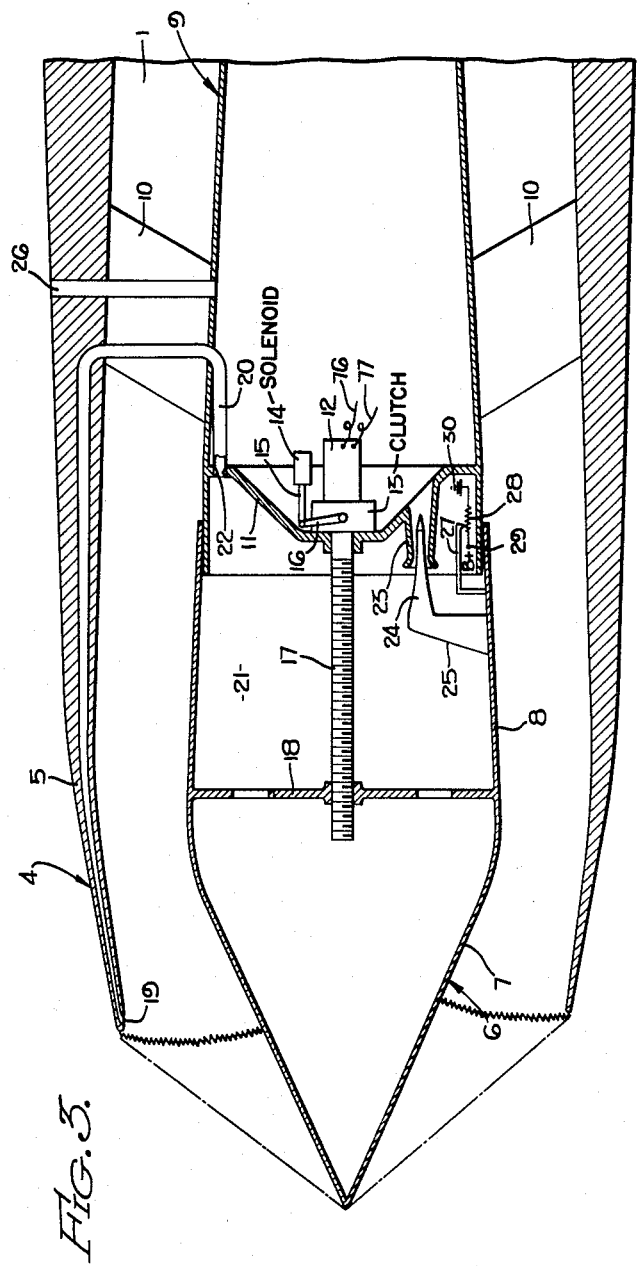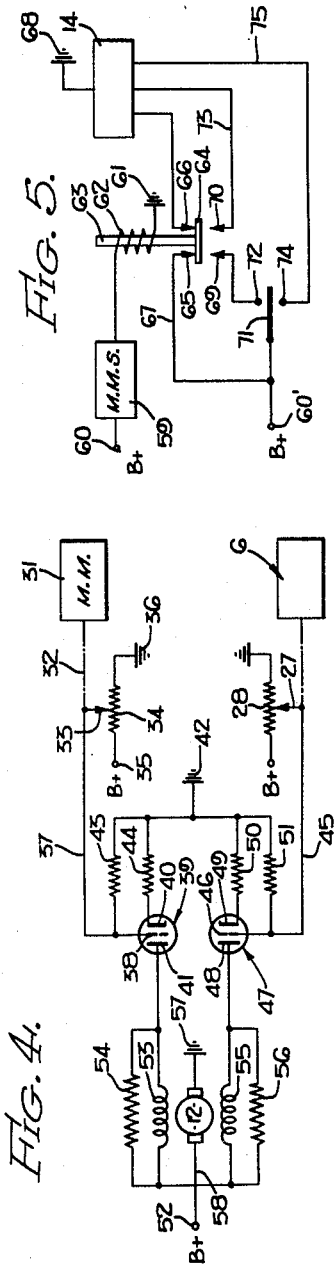

June 7, 1960   J. C. WISE   2,939,277
ENGINE DIFFUSER SPIKE POSITIONING SYSTEM
Filed Feb. 24, 1954   3 Sheets-Sheet 3
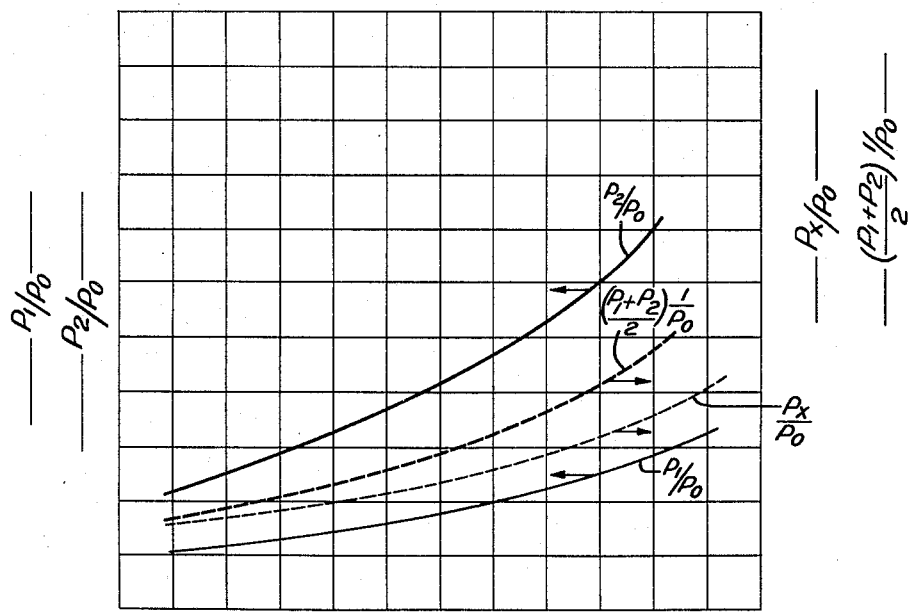
FIG. 7.   MACH NUMBER
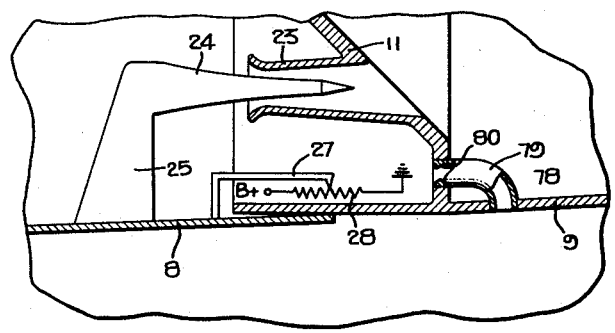
FIG. 8.
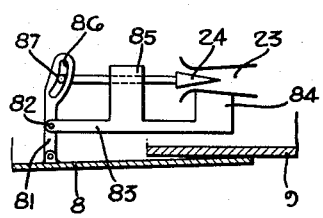
FIG. 9.
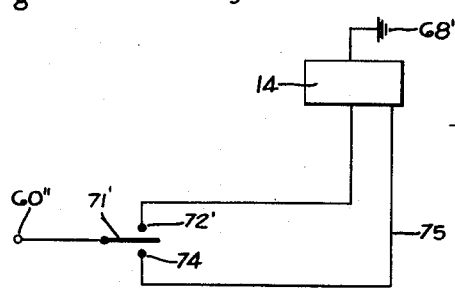
FIG. 6.
INVENTOR,
JAMES C. WISE
BY R. E. Geauque
ATTORNEY United States Patent Office 2,939,277
Patented June 7, 1960

2,939,277

ENGINE DIFFUSER SPIKE POSITIONING SYSTEM

James C. Wise, Woodland Hills, Calif., assignor to The Marquardt Corporation, a corporation of California Filed Feb. 24, 1954, Ser. No. 412,232

14 Claims. (Cl. 60—35.6)

This invention relates to a control system for positioning the diffuser spike of air breathing engines, such as turbojets (with or without afterburner and/or variable exit nozzles) and ramjets, which operate over a wide range of flight speeds and more particularly relates to a control system which will position the diffuser inlet spike so that critical operation of the diffuser will be maintained during flight at supersonic Mach numbers with the normal shock in the vicinity of the diffuser lip.

Prior systems have utilized electric motors to vary the inlet area of the diffuser by positioning the diffuser spike to maintain normal shock at the diffuser lip and such systems require complicated electronic and electrical controls for sensing the presence of normal shock and separately setting up an inlet area schedule. The control system of the present invention is wholly pneumatic in operation and provides a control pressure ($P_x$) within the interior of the spike which balances the pressure force on the exterior of the spike and since this exterior force is a function of flight Mach number, it is possible to derive the pressure ($P_x$) from the diffuser lip static pressure ($P_1$) which is also a function of Mach number. The pressure ($P_1$) is normally greater than the pressure on the exterior of the spike, and therefore the pressure ($P_1$) can be reduced so that it corresponds to the pressure ($P_x$) required at any given Mach number to just balance the exterior pressure force against the diffuser spike. Therefore, the pressure ($P_1$) can be utilized in connection with a pressure divider system controlled by the spike position, to schedule the diffuser inlet area with flight Mach number. The word "schedule" is used herein to denote a prescribed relationship between an input variable and an output variable. At Mach numbers above about 1.4, the movement of normal shock along with the diffuser spike causes rapid pressure change at the diffuser lip and this pressure change can be used to override the schedule with Mach number to position the normal shock at the diffuser lip and maintain critical operation of the diffuser.

In the event that the exterior force on the spike might exceed that which can be developed by the static pressure ($P_1$), it is possible to also introduce the diffuser static pressure ($P_2$) to the interior of the spike, and since pressure ($P_2$) is always higher than pressure ($P_1$) at any given Mach number, a higher pressure ($P_x$) will be available to balance the exterior force. At Mach numbers of about 1.2 and below, the pressures ($P_1$) and ($P_2$) are too low for satisfactory operation, and it is therefore desirable to either hold the diffuser spike in wide open position or to control the spike position by a Mach meter in order to position the spike as a function of Mach number. Since the present invention is wholly pneumatic, the control system is not affected by heat, vibrations and other severe environments to the extent that the prior electronic and electrical systems are affected and since the control pressure can be derived from the diffuser itself, the system is not dependent upon the performance of other power units in the aircraft at high Mach numbers and failure of these other systems will not affect the control of the diffuser.

It is therefore an object of the present invention to provide a control system for a variable area supersonic diffuser which schedules the inlet area in accordance with the static pressure at the diffuser lip ($P_1$) by utilizing a fraction of this pressure to balance the external forces on the spike.

Another object of this invention is the provision of a control system operative at flight Mach numbers below about 1.4 to schedule the inlet area of a diffuser in accordance with changes in Mach number by utilizing the pressure ($P_1$) which is a function of Mach number.

A further object of the invention is to provide a control system which senses the static pressure change at the diffuser lip as normal shock moves past the lip, and which utilizes this pressure change in order to schedule the diffuser inlet area in a manner that normal shock is held at the diffuser lip and critical operation maintained.

A still further object of the invention is to provide a control system which schedules the inlet area by balancing a fraction of the pressure ($P_1$) against the external force on the inlet spike through the expedient of varying said fraction with spike position.

Another object of the invention is to control the diffuser spike position by a Mach meter at flight Mach number below which the pressure ($P_1$) cannot be utilized.

A still further object of the invention is to provide means for holding the inlet spike in position to give maximum inlet area at low Mach numbers where the pressure ($P_1$) cannot be used for control purposes.

A still further object of the invention is to balance the external forces on a diffuser spike in accordance with changes in the diffuser lip static pressure ($P_1$) and also in accordance with the diffuser static pressure ($P_2$).

These and other objects of the invention not specifically set forth above will become readily apparent from the accompanying description and drawings in which:

Figure 3 is a diagrammatic view of the invention showing the manner in which the pressure ($P_1$) is introduced into the interior of the diffuser spike.

Figure 4 is a schematic wiring diagram of the control system utilized to position the diffuser spike at Mach numbers below about 1.2.

Figure 5 is a schematic wiring diagram for controlling a clutch to disconnect the Mach meter control at Mach numbers above about 1.2.

Figure 6 is a schematic wiring diagram of a modified form of control system for the clutch which is used to maintain maximum diffuser inlet area at Mach numbers below about 1.2.

Figure 7 is a graphical representation of the variation of ($P_2/P_0$) and ($P_1/P_0$) and illustrates the manner in which the pressures ($P_2$) and ($P_1$) can be utilized to obtain an increased pressure ($P_x$).

Figure 8 is a diagrammatic view of a modified form of the invention showing the manner in which pressure ($P_2$) is supplied to the diffuser.

Figure 9 is a diagrammatic view of a follow-up utilized for scheduling diffuser inlet area by adjusting a variable area orifice.

Figure 1:
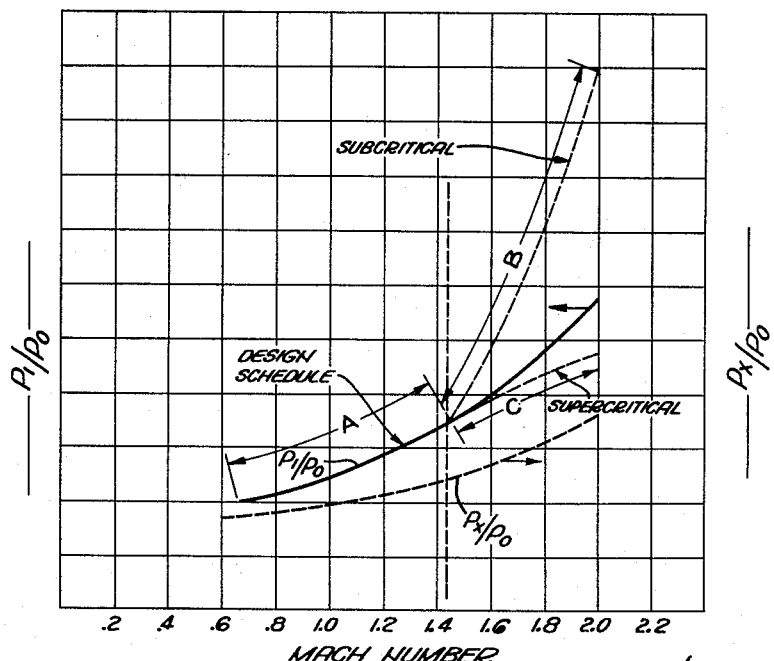
Figure 1 is a grapical representation of the selected schedule of ($P_1/P_0$) with Mach number and also showing the variation with Mach number of the pressure ($P_x$) required to hold the diffuser spike in equilibrium.
Figure 2:
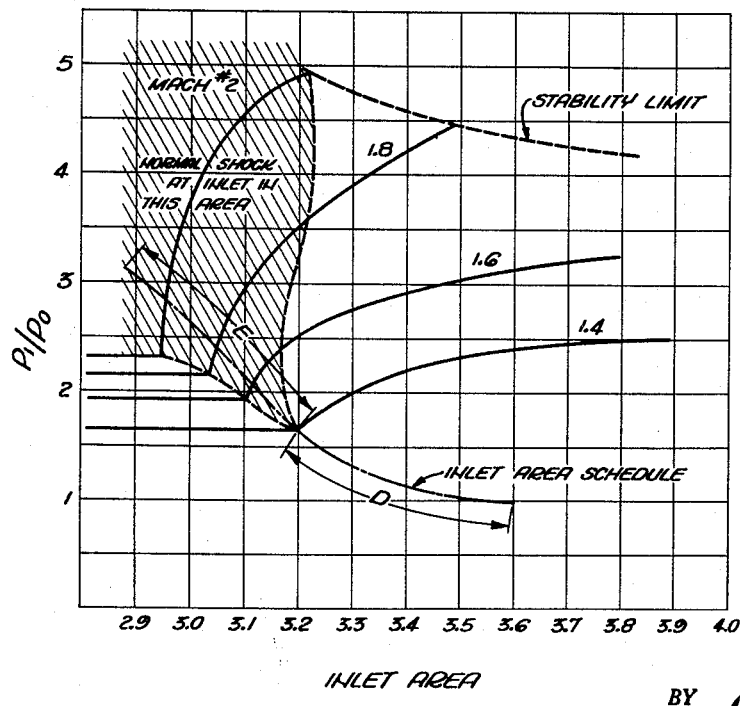
Figure 2 is a graphical representation of the schedule of ($P_1/P_0$) with diffuser inlet area using Mach number as a parameter.

Referring to Figure 1, the portion A of the ($P_1/P_0$) curve illustrates that in the Mach number range below about 1.4, ($P_1/P_0$) is a single valued function of Mach number. At higher Mach numbers, ($P_1/P_0$) is a double valued function determined by whether the diffuser is operating subcritically with the normal shock ahead of the diffuser lip or is operating supercritically with normal shock behind the diffuser lip. In the region of Mach numbers below about 1.4, the diffuser inlet area can be scheduled against Mach number by scheduling the inlet area with $(P_1/P_0)$ which is a function of Mach number and portion D of Figure 2 represents such a schedule. At Mach numbers of about 1.4 and above, too large an inlet area will cause the diffuser to operate subcritically and $(P_1/P_0)$ will vary with Mach number along portion B of Figure 1. On the other hand, too small an inlet area will cause the diffuser to operate supercritically and $(P_1/P_0)$ will vary with Mach number along portion C of Figure 1. Since the value of $(P_1/P_0)$ for critical operation lies between the values of this ratio for subcritical and supercritical operation, respectively, it is possible to arbitrarily schedule the inlet area with $(P_1/P_0)$ so that normal shock will be positioned at the diffuser lip to maintain continual critical operation, and such an arbitrary schedule is illustrated by portion E of Figure 2. It will be noted that at each Mach number above about 1.4, the value of $(P_1/P_0)$ rises rapidly as normal shock moves forwardly past the diffuser lip and this rise in $(P_1/P_0)$ at any given Mach number occurs over a small change in inlet area so that it is possible to arbitrarily schedule inlet area against $(P_1/P_0)$ and maintain normal shock at the diffuser lip to give critical operation of the diffuser.

Since the exterior force on the diffuser spike and the pressures $(P_1)$ and $(P_x)$ vary with atmospheric static pressure $(P_0)$, the pressure $(P_1)$ can be utilized to balance the exterior force without correcting the pressure $(P_1)$ for changes in pressure $(P_0)$. Also, it is noted that the slope of the $(P_x/P_0)$ curve required to just balance the exterior force is less than the slope of the curve of $(P_1/P_0)$, so that the pressure $(P_x)$ must be a varying fraction of pressure $(P_1)$ depending upon flight Mach number and the required change in this fraction results from change in spike position in accordance with the schedule of inlet area. Referring to Figure 7, it is seen that both the pressure $(P_1)$ and the higher pressure $(P_2)$ can be utilized to obtain an average pressure $$\frac{(P_1+P_2)}{2}$$

higher than $(P_1)$ so that a higher pressure $(P_x)$ is available to balance the external force on the diffuser spike. It is understood that the numerical values applied to Figures 1 and 2 are for one diffuser design only and will change with the geometry of the diffuser, but the curves will maintain the same characteristics.

An embodiment of the invention is illustrated in Figure 3 wherein a supersonic diffuser 4 is comprised of an engine cowling 5 and a movable inlet or diffuser spike 6 having a conical nose section 7 and a circular base portion 8. A circular body member 9 is supported within the cowling 5 by means of struts 10 and the remaining components of the engine are positioned behind member 9. One end of member 9 projects into the open base portion 8 in order to slidably support the base portion. A partition 11 of member 9 supports an electric motor 12 having a clutch 13 operated by a solenoid 14 through arms 15 and 16. The motor 12 is connected to jack screw 17 which is threaded through a partition 18 in inlet spike 6 so that rotation of the screw by the motor will move the spike 6 back and forth to vary the inlet area of the diffuser. The cowling 5 contains a static pressure opening 19 to measure the diffuser lip static pressure $(P_1)$ and this pressure is communicated by passage 20 to space 21 defined by the partition 11 and the surface of diffuser spike 6. The passage 20 has a restriction 22 located at the entrance of the passage into space 21 and air continually leaves the space 21 through a passage 23 in the form of an orifice carried by partition 11. The area of this orifice is made variable by the axial movement of the contoured needle 24 which is carried by support 25 secured to circular base portion 8. The orifice 23 exhausts to freestream, static pressure $(P_0)$ which is continually communicated to the interior of circular member 9 through a passage 26. A follow up wiper 27 is secured to the circular base portion 8 and bears against a winding 28 which is connected between source 29 and ground 30.

The fixed restriction 22 and the variable orifice 23 form the two orifices of a pressure divider device such as is disclosed in U.S. Patent No. 2,645,240 granted July 14, 1953, to John A. Drake. The pressure $(P_1)$, at Mach numbers above about 1.2, is sufficient to cause sonic velocity flow at the throat of both orifices so that the pressure in space 21 is some fraction $(P_x)$ of pressure $(P_1)$ as determined by the ratio of the area of orifice 23 to the area of orifice 22. Therefore, the pressure $(P_1)$ can be utilized to position the inlet spike through use of the pressure divider system by contouring the needle 24 so that the pressure $(P_x)$ in space 21 is just sufficient to balance the external forces when the needle 24 and the diffuser spike are in the schedule position to give the desired inlet area. By contouring the needle 24 to vary the area of orifice 23, there will be only one position of the spike at which the pressure $(P_x)$ will balance the external forces, and therefore the inlet area of the diffuser will be scheduled in accordance with the pressure $(P_1)$. During the time the pressure divider system is in operation, the jack screw 17 will be allowed to rotate freely so that it will not interfere with movement of the cone under the influence of the pressure in space 21.

In operation of the device, an increase in flight Mach number will cause an increase in pressure $(P_1)$, resulting in an increase in pressure $(P_x)$. This increased value of $(P_x)$ will be higher than necessary to balance the external force on the spike since the external force does not increase as rapidly as the pressure $(P_1)$. Therefore, the spike 6 will move forwardly to decrease the inlet area and at the same time, the needle 24 will increase the area of orifice 23 until the pressure $(P_x)$ is reduced sufficiently to just balance the external force, at which time movement of the spike will cease and the inlet area will correspond to that called for by the schedule for the higher value of $(P_1)$. However, when the flight Mach number decreases, the pressures $(P_1)$ and $(P_x)$ will decrease more rapidly than the external force on the spike which will result in rearward movement of the spike. This movement of the spike will cause needle 24 to reduce the area of orifice 23 in order to increase the pressure $(P_x)$ and when the pressure $(P_x)$ just balances the external force on the spike, the spike will have moved to its scheduled position, providing the increased inlet area called for by the lower value of $(P_1)$.

At any given flight altitude and Mach number, above about 1.4, the external force on the spike is constant and the control system of the invention serves to maintain the normal shock at the diffuser lip by scheduling the inlet area against the pressure $(P_1)$. When the normal shock moves forward because of a change in the engine airflow consumption, the pressure $(P_1)$ increases rapidly with a corresponding increase in the pressure $(P_x)$ in space 21. This increase in pressure $(P_x)$ causes the spike to move against the exterior force to reduce the inlet area and at the same time, the needle 24 increases the area of orifice 23. The forward movement of the spike causes the normal shock to move rearwardly until the pressure $(P_1)$ corresponds to the schedule pressure and the pressure $(P_x)$ again balances the exterior force on the spike at which time critical operation will again result. In the event the airflow consumption of the engine causes the normal shock to move rearwardly from the pressure probe 19, a decrease in pressure $(P_1)$ and in pressure $(P_x)$ will result and the cone will move rearwardly in order to move the normal shock back toward the pressure probe and thereby increase the pressure ($P_1$). The needle 24 adjusts the area of orifice 23 to provide a pressure ($P_x$) which will just balance the forces on the cone when the scheduled pressure ($P_1$) is at the probe 19. It is understood that for each schedule pressure ($P_1$), there is only one position of the needle within the orifice 23 which will cause equilibrium of the pressure ($P_x$) and the external pressure on the cone. Thus, it is apparent that the pressure ($P_1$) can be utilized to vary the inlet area in accordance with a selected schedule and that the pressure ($P_1$) will cause a change in inlet area with a change in Mach number and also will control the position of the spike to maintain normal shock at the diffuser lip when changes in engine airflow consumption occur at high Mach numbers.

At Mach numbers below about 1.2, the control pressures no longer have the proper relationship and the system does not continue to operate in the same manner. However, it is possible at these Mach numbers to schedule the inlet area as a function of Mach number by utilizing a Mach meter which measures flight speed. Referring to Figure 4, a Mach meter 31 of any well-known construction is connected through link 32 to a wiper 33 which continually bears against a potentiometer winding 34 and the wiper 33 is connected through line 37 to the grid 38 of a tube 39 having a cathode 40 and a plate 41. The line 37 is connected to ground 42 through a bias resistance 43 and cathode 40 is connected to ground 42 through a bias resistance 44. The spike 6 moves the wiper 27 on winding 28 and this wiper is connected through line 45 to the grid 46 of tube 47 which has a plate 48 and a cathode 49. The cathode 49 is connected to ground 42 through a bias resistance 50 and line 45 is connected to ground 42 through a bias resistance 51. The source 52 is connected to plate 41 through motor winding 53 and resistance 54, arranged in parallel, while the plate 48 is connected to source 52 through motor winding 55 and resistance 56, arranged in parallel. Also, the armature of the motor is connected to ground 57 through line 58. It is apparent that the current flow through winding 53 will be governed by the voltage on the grid 38 of tube 39 while the current flow through winding 55 will be controlled by the voltage on grid 46 of tube 47 and since the fields of windings 53 and 55 are opposed, the motor 12 will not operate when the same voltage occurs on both the grids. However, upon a change of flight Mach number, the Mach meter will move the wiper 33 in one direction or the other on winding 34 in order to unbalance the current flow in the two opposed coils and thus cause the motor 12 to drive the spike 8 in the required direction to provide an inlet area corresponding to the inlet area schedule. At the same time, the wiper 27 will move with the diffuser spike 6 until the current in winding 55 is exactly equal and opposed to that in winding 53, at which time the motor will cease to move the spike and the spike will have been moved to its scheduled area corresponding to the new Mach number. It is understood that the potentiometer composed of winding 34 and wiper 33 is non-linear and is arbitrarily designed to give a voltage which will vary with Mach number in accordance with the schedule of Figure 1.

The circuit illustrated in Figure 5 is utilized to control clutch 13 so that the clutch is automatically engaged at Mach numbers below about 1.2 and is automatically released at higher Mach number so that the pneumatic control system previously described can operate. A Mach meter switch 59 is controlled by the Mach meter 31 and is connected between source 60 and ground 61 through a solenoid winding 62. At Mach numbers below about 1.2, the switch is closed in order to draw the armature 63 of the solenoid upwardly and bring switch arm 64 against contacts 65 and 66 to complete a circuit from source 60' through line 67 to the solenoid 14 and energize the solenoid in a manner to engage the clutch 13. With the clutch engaged, the spike will be positioned by the Mach meter control system. However, when the flight speed rises above a Mach number of about 1.2, the switch 59 is opened by the Mach meter and the switch arm 64 will move against contacts 69 and 70. A switch 71 is likewise connected to source 60' and when the switch is positioned against contact 72, a circuit is completed through switch arm 64 and line 73 to solenoid 14 in order to energize the solenoid in a manner to disengage clutch 13 and allow the pressure inside of space 21 to control the position of the spike automatically. However, when the switch arm 71 is moved against contact 74, the line 73 will be de-energized and the solenoid 14 will be energized to engage the clutch 13, so that when the motor is manually energized through leads 76 and 77, the spike can be positioned by the motor in order to override the pneumatic control system.

Instead of utilizing the Mach meter control, the inlet area can be held wide open at Mach numbers below about 1.2 without appreciable loss in efficiency. When the diffuser spike is operated in this manner, the follow up wiper 27 and winding 28 can be eliminated and the solenoid 14 will be controlled by the circuit illustrated in Figure 6. The switch arm 71' is connected to source 60" and can be moved against contact 72' to disengage clutch 13 and can be moved against contact 74' to energize solenoid 14 so that the motor can be energized through leads 76 and 77 to move the spike into fully open position. After the flight Mach number has increased beyond about 1.2, the clutch 13 can be disengaged to permit screw 17 to rotate freely so that the pneumatic system can function.

In some applications, the pressure ($P_x$) within the cone obtained by dividing pressure ($P_1$) may be too small to balance the exterior pressure forces. In this case, the diffuser static pressure ($P_2$) can also be admitted to the space 21 in order to increase the pressure ($P_x$). The probe for the pressure ($P_2$) is so positioned that it will always be downstream of the rearwardmost position of the normal shock. Referring to Figure 7, it is seen that the ratio ($P_2/P_0$) is a function of Mach number and is continually higher at all Mach numbers than the ratio ($P_1/P_0$). Therefore, the curve of $$\frac{(P_1+P_2)}{2}$$

lies between the ($P_2/P_0$) and ($P_1/P_0$) curves and the ($P_x$) curve lies between the ($P_1/P_0$) curve and the $$\frac{(P_1+P_2)}{2}$$

curve. When the pressure ($P_x$) required to balance the external forces on the spike is greater than ($P_1$), the necessary control pressure ($P_x$) can be obtained by utilizing the pressure ($P_2$) in a second pressure divider system. Figure 8 illustrates this modified form of the invention wherein the static pressure ($P_2$) is measured at opening 78 and is communicated to space 21 through passage 79 which has a restriction 80 with sonic velocity flow at its throat so that the pressure ($P_x$) within the space 21 will be some higher value than if it were only a fraction of the pressure ($P_1$). Since both the pressures ($P_1$) and ($P_2$) are admitted to space 21 and are functions of Mach number up to a Mach number of about 1.4, the system will function in the same manner as the system which utilizes only pressure ($P_1$). Also, the system will be independent of pressure ($P_0$) since all the control pressures vary with ($P_0$). At Mach numbers above about 1.4, where the normal shock attaches to the spike, variations at the static pressure probe 19 will still be sensed as the shock moves forwardly or rearwardly past the probe and these variations can be utilized in addition to pressure ($P_2$) in order to automatically position the spike in the manner previously described. It is understood that the modification of Figure 8 can be utilized in connection with the Mach meter control system or that the diffuser spike can be held in wide open position through the manual control switch 71'.

While the desired schedule of inlet area can be obtained by contouring needle 24, it is also possible in all forms of the invention to use a standard needle and vary the needle position through a variable follow-up connected between the needle and the spike. Such a follow-up is illustrated in Figure 9 and consists of a lever 81 pivotally connected to base portion 8 and pivotally supported intermediate its ends by pin 82 in arm 83 which is carried by bracket 84 secured to the exterior of nozzle 23. The arm 83 has a projection 85 which contains a slot for slidably supporting needle 24 for movement within orifice 23. The end of arm 81 has a cam groove 86 which receives roller 87 on the end of needle 24 and the cam groove is so contoured that the effective linkage arm between roller 87 and pin 82 varies with movement of arm 81 in a manner to position the needle 24 to obtain the desired schedule. It is understood that the schedule curve of inlet area can be varied by simply varying the contour or shape of groove 86 instead of changing the contour of the needle.

By the present invention, a diffuser spike positioning system is provided which is wholly pneumatic in its operation above Mach numbers of about 1.2 and at lower Mach numbers, the spike can be held either in wide open position or can be automatically scheduled with Mach numbers by use of a Mach meter control system. The static pressure at the diffuser lip ($P_1$) can be utilized to balance the exterior force on the spike and pressure ($P_2$) can be also utilized to increase the pressure ($P_x$) when necessary. Any desired schedule of inlet area with pressure ($P_1$) can be selected by contouring needle 24 or by the utilizing of the necessary follow-up linkage between the spike and needle 24. Also, other types of control systems can be utilized in connection with the Mach meter in order to position the spike at low Mach numbers. Since the pressures ($P_1$), ($P_2$) and the exterior force on the spike are all variable in the same manner with atmospheric static pressure ($P_0$), it is not necessary to compensate for changes in atmospheric pressure and the device will operate independently of corrections for altitude. Various other modifications will become readily apparent to those skilled in the art without departing from the spirit and scope of the invention as hereinafter defined in the appended claims.

What is claimed is:

1. A control control system for a variable area diffuser comprising movable means positioned at the inlet of the diffuser for varying the inlet area of said diffuser, means for obtaining a single static pressure at the diffuser lip, and means responsive to the position of said movable means for reducing said single static pressure to a pressure which will just balance the exterior pressure on said movable means and thereby schedule the inlet area with said static pressure, said reduced pressure being applied to said movable means in opposition to said external pressure.

2. A control system as defined in claim 1 wherein said pressure reducing means is comprised of a fixed orifice, the interior space of said movable means and an orifice having its area adjustable in accordance with the position of said movable means.

3. A control system for a variable area diffuser comprising movable means positioned at the inlet of the diffuser for varying the inlet area of said diffuser, supporting means for slidably supporting said movable means, said supporting means and said movable means defining a variable closed space within said movable means, means for obtaining the static pressure at the diffuser lip, a fixed orifice for introducing said static pressure into said space, and a variable area orifice for exhausting said space to atmospheric static pressure, the area of said variable area orifice being adjustable by movement of said movable means until the pressure in said space just balances the exterior force on said movable means.

4. A control system as defined in claim 3 wherein said variable area orifice comprises a nozzle carried by said supporting means and a contoured needle carried by said movable means for movement within said nozzle, said needle being contoured to schedule the position of said movable means in accordance with said static pressure.

5. A control system as defined in claim 3 wherein said variable area orifice comprises a nozzle carried by said supporting means and a needle carried by said movable means for movement within said nozzle and follow-up means connected between said movable means and said needle in order to vary the area of said variable area orifice in a predetermined manner and thereby schedule diffuser inlet area with said static pressure.

6. A control system for a variable area diffuser comprising movable spike means for varying the inlet area of said diffuser, means for obtaining the static pressure at the diffuser lip, pressure divider means responsive to spike position for reducing said static pressure sufficiently to just balance the exterior pressure on said spike means so that said spike means is positioned in accordance with said static pressure and independent power means for positioning said spike means in accordance with Mach number during flight at Mach numbers below which said pressure divider means becomes inoperative.

7. A control system as defined in claim 6 wherein said power means comprises means adjustable in accordance with measured flight speed for moving said spike means and means adjustable in accordance with spike position to interrupt said spike moving means when the spike position corresponds to the schedule of inlet area with flight speed.

8. A control system as defined in claim 6 wherein said power means comprises a potentiometer controlled by a Mach meter to give a signal corresponding to flight Mach number, a follow-up potentiometer controlled by said spike means to give a signal corresponding to spike position, and electrical means for moving said spike means when said signals are unequal.

9. A control system as defined in claim 8 wherein said electrical means is connected to said spike through clutch means and switch means controlled by said Mach meter for engaging said clutch when said spike means is positioned by said power means and for releasing said clutch when said spike means is positioned in accordance with said static pressure.

10. A control system for a variable area diffuser comprising movable spike means for varying the inlet area of said diffuser, means for sensing the static pressure at the diffuser lip, a pressure divider system having a fixed inlet orifice receiving said static pressure and a variable area outlet orifice, a space between said two orifices having a fraction of said static pressure determined by the ratio between the throat areas of said two orifices, and means connected to said spike means for varying the area of said variable area orifice, said spike means being moved by the differential between the pressure in said space and the exterior pressure on said spike until said variable area orifice is adjusted to provide a pressure in said space equal to said exterior pressure.

11. A control system for a variable area diffuser comprising movable means for varying the inlet area of said diffuser, a space having a pressure operative against the exterior pressure on said movable means, a first fixed orifice for introducing diffuser lip static pressure ($P_1$) to said space, a second fixed orifice for introducing diffuser static pressure ($P_2$) to said space, a variable area orifice connecting said space to atmospheric static pressure ($P_0$), the pressure in said space being determined by the average of pressures ($P_1$) and ($P_2$) and the area of said variable area orifice, and means connected to said movable means for varying the area of said outlet orifice until the pressure in said space becomes equal to said exterior pressure.

12. A control system for a variable area diffuser comprising movable spike means for varying the inlet area of said diffuser, means for obtaining a single static pressure at the diffuser lip, and means for varying said inlet area in accordance with said single static pressure, said varying means comprising means for obtaining a fraction of said static pressure which is variable with the position of said spike means so that the inlet area can be varied in accordance with said static pressure by balancing said fraction against the external pressure on said spike means, said inlet area being varied as a function of flight Mach number at flight speeds below which normal shock attaches to said spike means and being varied to maintain critical operation of said diffuser at higher flight speeds.

13. A control system for a variable area diffuser comprising movable spike means for varying the inlet area of said diffuser, means for obtaining a single static pressure at the diffuser lip, and means for varying said inlet area in accordance with said single static pressure, said varying means comprising means for obtaining a fraction pressure of said static pressure which is determined by the position of said spike means and means responsive to said fraction pressure for exerting a force on said spike means in opposition to the external pressure force on said spike means, said spike means being moved by the opposing forces thereon until said forces balance one another.

14. A control system for a variable area diffuser comprising a cowling and spike means movable within said cowling for varying the inlet area of said diffuser, means located at the inlet of said cowling for obtaining a single static pressure at the diffuser lip, a space containing a pressure operative on said spike means in a direction opposite to the exterior pressure on said spike means, an inlet restriction for introducing said single static pressure to said space, an outlet restriction connected with said space, and means connected with said spike means for varying the the area of one of said restrictions upon movement of said spike means to vary the pressure in said space operative on said spike means.

References Cited in the file of this patent

UNITED STATES PATENTS

| | | |
|---|---|---|
| 2,540,594 | Price | Feb. 6, 1951 |
| 2,632,295 | Price | Mar. 24, 1953 |
| 2,638,738 | Salter | May 19, 1953 |
| 2,645,240 | Drake | July 14, 1953 |
| 2,677,232 | Collins | May 4, 1954 |